United States Patent [19]

Rhodes

[11] 4,266,797
[45] May 12, 1981

[54] SAFETY HITCH CATCH

[76] Inventor: Charles D. Rhodes, P.O. Box B, Petersburg, Tex. 79250

[21] Appl. No.: 27,661

[22] Filed: Apr. 6, 1979

[51] Int. Cl.³ .......................... B60D 1/06; B62D 53/06
[52] U.S. Cl. ................................. 280/423 R; 280/512
[58] Field of Search .................. 280/423 R, 435, 512, 280/511, 513, 509, 507

[56] References Cited

U.S. PATENT DOCUMENTS

| | | | |
|---|---|---|---|
| 2,772,895 | 12/1956 | Steeves et al. | 280/435 X |
| 3,650,546 | 3/1972 | Koenig | 280/423 R |
| 3,659,876 | 5/1972 | Melton | 280/511 |

FOREIGN PATENT DOCUMENTS 952934  8/1974  Canada ................................. 280/511

Primary Examiner—John A. Pekar
Attorney, Agent, or Firm—Wendell Coffee

[57] ABSTRACT

A bail type ball and socket coupler has an extension bail handle welded to the bail and an extension catch handle welded to the catch. The ends of the handle are parallel. Therefore, the hitch may be operated from a remote position by the extension handles and also a positive lock may be used over the parallel ends of the handle so that the hitch is positively locked. Furthermore, the slide which positively locks the extension handle is readily visible from many positions so that the operator may know if the hitch is positively locked.

9 Claims, 6 Drawing Figures

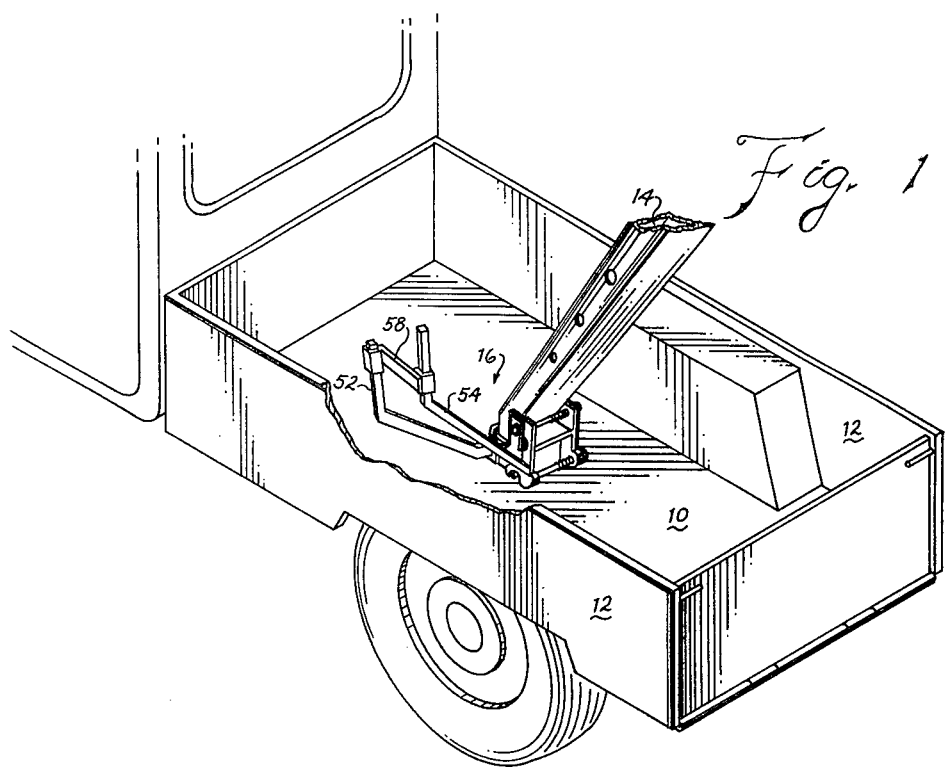
Fig. 1
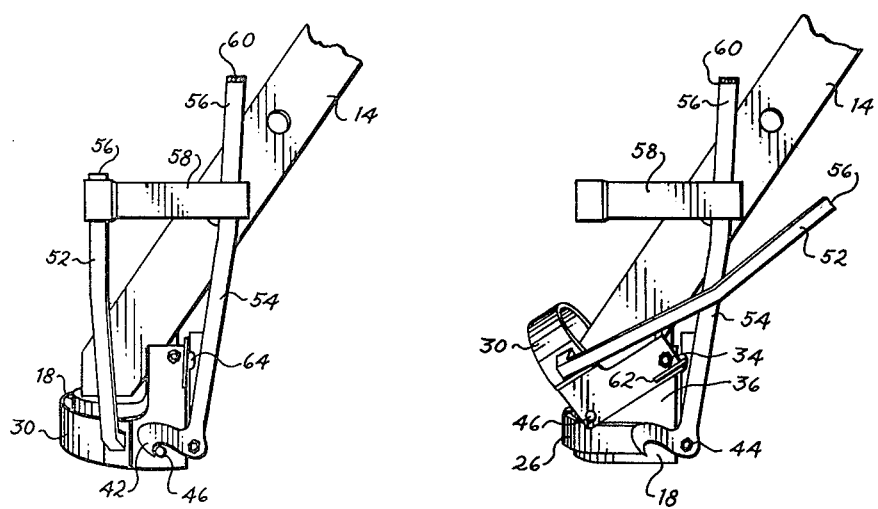
Fig. 2
Fig. 3

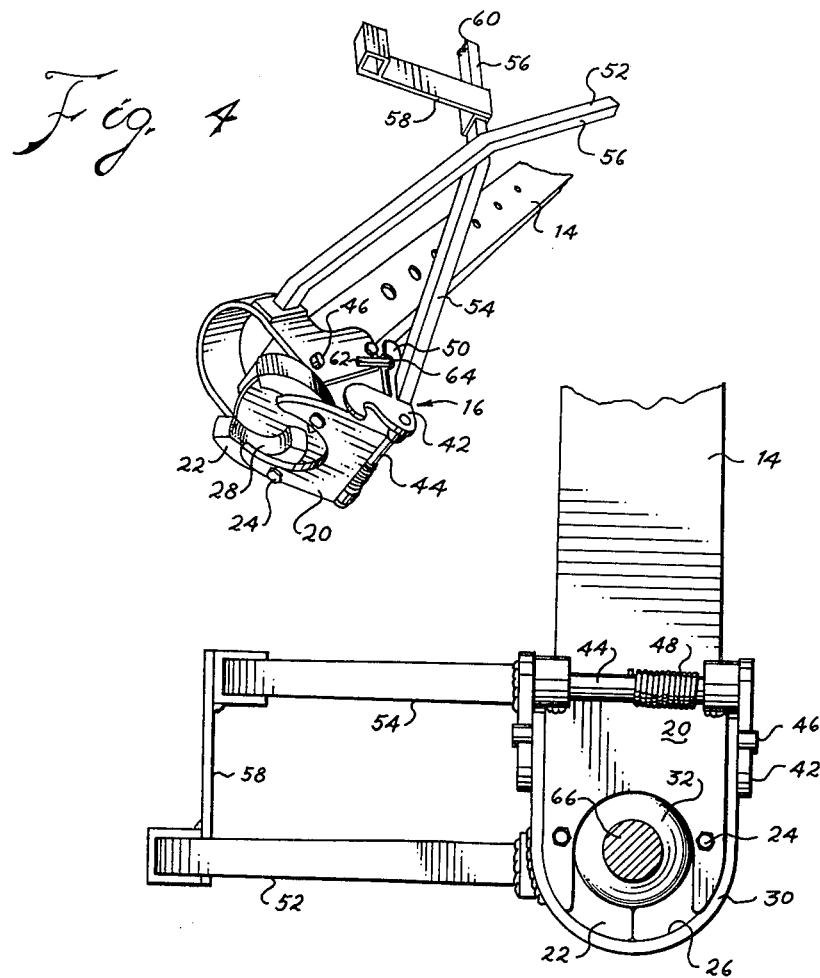
Fig. 4
Fig. 5
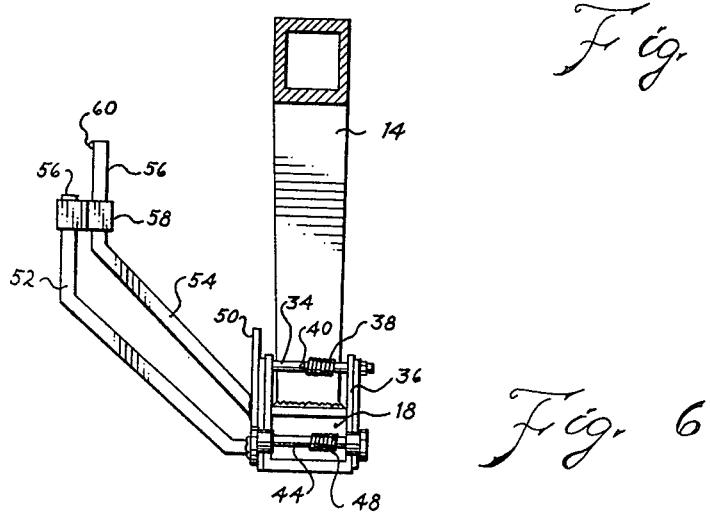
Fig. 6

SAFETY HITCH CATCH

BACKGROUND OF THE INVENTION

1. Field of the Invention

This invention relates to ball and socket couplers for trailers and more particularly to a socket which has a pivoted jaw.

2. Description of the Prior Art

Before my invention, gooseneck trailers were towed by a ball mounted on the bed of a pickup truck which resulted in a good distribution of weight upon the pickup. Coupler socket with pivoting jaws held by a bail were known.

Difficulty was experienced in the operation of these couplers inasmuch as to disengage the trailer, the operator had to either climb into the bed of the pickup to release the lock and bail upon the socket or if he did not climb into the bed of the pickup, he had to reach over the pickup sideboards to release the catch and bail. With these released, he then moved the pickup away from the trailer. When he hitched the trailer to the pickup he again had to either climb into the bed of the pickup or reach across the sideboards of the pickup.

Before this application was prepared, the applicant caused a search to be made in the U.S. Patent and Trademark Office. The following U.S. Pat. Nos. were located upon this search:
- Rasmussen—2,130,100
- Schroeder—2,179,432
- Hendricks—2,269,023
- Waddle—2,853,317
- Bacher—3,376,051
- Dickmann—3,837,679

WADDLE, BACHER and RASMUSSEN all show ball couplers with relatively long arms or handles by which they may be activated. Applicant does not believe that any of the handles are adapted for remote operation. Also, these patents do not show double handles, i.e., one handle to actuate the coupler and another handle to actuate a safety catch.

HENDRICKS discloses a remote operating hitch, however, it is not a ball and socket coupler.

The other patents do not appear to be as pertinent as those particularly discussed above.

SUMMARY OF THE INVENTION

(1) New and Different Function

I have invented a ball and socket type coupler which can be operated from a remote position. Furthermore, I have provided for a readily visible positive lock whereby the hitch may be locked into position and a hurried glance will indicate that the hitch is locked. Specifically, I have attached extension handles onto a standard bail type pivoted jaw coupler and also the safety catch thereof. When the safety catch is positioned, the two handles are locked together so that neither the safety catch nor the bail can be moved until the lock is removed.

Thus, it may be seen that the function of my total combination far exceeds the sum of the individual functions of the individual parts such as pivot pins, jaws, arms, springs, etc.

(2) Objects of This Invention

An object of this invention is to connect a trailer to a towing vehicle.

Further objects are to achieve the above with a device that is sturdy, compact, durable, lightweight, simple, safe, efficient, versatile, and reliable, yet inexpensive and easy to manufacture, adjust, operate and maintain.

Other objects are to achieve the above with a method that is versatile, ecologically compatible, energy conserving, rapid, efficient, and inexpensive, and does not require highly skilled people to adjust, operate, and maintain.

The specific nature of the invention, as well as other objects, uses, and advantages thereof, will clearly appear from the following description and from the accompanying drawing, the different views of which are not scale drawings.

BRIEF DESCRIPTION OF THE DRAWING

FIG. 1 is a perspective view of an embodiment of my invention showing a portion of the gooseneck of the trailer carrying the socket part of the coupler and the pickup carrying the ball portion.

FIG. 2 is a side perspective view of the socket portion of the coupler on the gooseneck in the locked closed position.

FIG. 3 is a side perspective view of the socket in the latched open position.

FIG. 4 is a bottom perspective view of the socket in a latched open position.

FIG. 5 is a bottom plan view of the socket in the locked closed position showing the ball locked within the socket.

FIG. 6 is a rear elevational view of the socket portion of the coupler.

DESCRIPTION OF THE PREFERRED EMBODIMENT

Referring to the drawings, particularly FIG. 1, there may be seen a pickup having bed 10 with sideboards 12. Gooseneck 14 extends from a trailer (not shown). Ball 32, which is hidden from view in FIG. 1, extends up from the bed and connects to socket portion 16 of the coupler. The socket itself is a bail type coupler, i.e., referring to FIGS. 3, 4 and 5 of the drawing, socket portion 16 has body 18 which is welded to the gooseneck 14. Bifurcated plate 20 is on the bottom of the body. It is separated from the remainder of the body by the space occupied by jaws 22. Each jaw is pivoted upon jaw bolt 24 extending upward through the bifurcated plate into the remainder of the body 18. The two jaw bolts are parallel to each other. Each of the jaws have outer face 26 and concave inner face 28. When the jaws are closed and held closed by holding means in the form of bail 30, the inner face 28 of the jaws will fit snuggly around the ball 32.

Bail bolt 34 (FIGS. 3 and 6) extends through ears 36 which extend upward from the rearward portion of each side of the body 18. The bail bolt 34 is normal to the jaw bolts 24. I.e., it extends horizontally and across the body. Torsion bail spring 38 surrounds the bail bolt 34 and has one end that bears against pin 40 extending from the bail bolt and another end which extends against a lug projected from one of the ears. As may be seen, the bail spring biases the bail into a holding or closed position.

Catch 42 is mounted to catch bolt 44 which is parallel to bail bolt 34. An identical catch 42 is attached on each side of the catch bolt 44. The catch locks over lugs 46 upon the bail 30. Catch spring 48 is a torsional spring surrounding the catch bolt 44 to bias the catch in a locked position. In the locked position, as seen in FIG. 2 of the drawings, the catches are locked to the lugs 46 and held in a locked position by a spring so that the bail 30 may not be released or opened. Short catch arm 50 is attached to the catch for manual operation.

The socket descirbed to this point is old, well known and commercially on the market before my invention.

To the socket, as described, I attach extension bail handle 52. The extension bail handle extends to one side of the socket and upward so that an operator may reach the bail handle across the sideboards 12 of the pickup. Extension catch handle 54 is attached to the short catch arm 50. It extends near the bail handle so that the two handles may be operated from the same position. Each of the handles has an end 56 which are close to one another and parallel to one another. Lock slide 58 is telescoped over the end of the catch handle. The top of the catch handle is upset forming protuberance 60 so that the lock slide cannot be removed from the extension catch handle 54. The other end of the lock slide 58 is adapted to be telescoped over the extension bail handle 52 as seen in FIG. 2.

When the lock slide is in locked position, the catch cannot be removed from lug 46 and the bail 30 could not be opened even if the catch were not over the lug 46. Furthermore, the lock slide 58 is readily visible from a distance or from the cab of a pickup so that the operator at any time at an instantaneous glance can see if the hitch is securely locked so that there is no danger of the trailer separating from the pickup.

In addition, finger 62 is attached to the end of the bail 30. Notch 64 is formed in the catch arm 50. When the catch is in the closed position and the bail is in the open position, the bail will be latched open as seen in FIGS. 3 and 4. This greatly facilitates the operation of the device as explained hereafter.

OPERATION

To explain the operation the starting position will be with the trailer attached to the ball on the pickup bed. To unhitch the trailer, the operator raises the lock slide 58 and opens the catch 42 by moving the extension catch handle 54. With the catch open, the bail 30 is raised by operation of the extension bail handle 52. With the bail open the extension catch handle is then moved forward to engage the finger 62 into the notch 64 to hole the bail in the open or release position. Then, the front of the trailer is raised by a jack, normally attached to the front of the trailer for this purpose so there is no weight of the gooseneck upon the ball. With this type hitch, it is not necessary to raise the gooseneck off the ball but merely to remove the weight from the ball so as the pickup truck moves forward, the hitch will not drag across the bed 10 of the pickup. With trailer supported and the tail gate open, then the pickup may be moved away from the trailer.

To reattach the trailer or a similar trailer to the pickup, the socket portion of the coupler is set in latch open position. The jaws are spread open and the height adjusted so that the height of the socket is about the same as the height of the ball. Then, the pickup is backed so that the ball enters above the bifurcated plate 20 and the bifurcated plate 20 surrounds or extends on either side of stem 66 of the ball 32. When the ball enters the socket, it will pivot the jaws 22 closed. Thereafter, the operator leaves the cab of the pickup and unlatches the socket by movement of the catch 42 by extension catch handle 54, allowing the bail 30 to fall over the outer face 26 of the jaws 22 holding them firmly and snuggly around the ball 32 with the ball stem 66 within the bifurcated plate 20. Then the catch is secured in place and the lock slide 58 placed over the ends 56 securely locking the hitch. Then the jack is placed in a travel position and the hitched rig is ready to travel.

As an aid to correlating the terms of the claims to the exemplary drawing, the following catalog of elements is provided:

| | |
|---|---|
| 10 bed | 40 pin |
| 12 sideboards | 42 catch |
| 14 gooseneck | 44 catch bolt |
| 16 socket portion | 46 lugs |
| 18 body | 48 catch spring |
| 20 bifurcated plate | 50 catch arm |
| 22 jaws | 52 extension bail handle |
| 24 jaw bolt | 54 extension catch handle |
| 26 outer face | 56 end |
| 28 inner face | 58 lock slide |
| 30 bail | 60 protuberance |
| 32 ball | 62 finger |
| 34 bail bolt | 64 notch |
| 36 ears | 66 ball stem |
| 38 torsion bail spring | |

The embodiment shown and described above is only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

I claim as my invention:

1. In a trailer ball and socket coupler, the socket having
    a. a body,
    b. a bifurcated plate on the bottom of the body,
    c. a jaw bolt extending upward on each side of the bifurcation into the body,
    d. said jaw bolts parallel to each other,
    e. a ball jaw pivoted to each of the bolts,
    f. each of the ball jaws having an outer face and a concave inner face,
    g. a bail bolt extending across the body normal to the jaw bolts,
    h. a bail pivoted to the body by said bail bolt,
    j. a bail spring innerconnecting the body and bail to bias the bail closed, and
    k. a catch mounted on the body to lock the bail in a closed position,
    m. so that a ball with a stem may be locked into the socket with the ball over the bifurcated plate and the stem within the bifurcation and the jaws snuggly clasping the ball by the concave inner face and the jaws held closed by the closed bail snuggly contacting the outside faces and the bail locked down by the catch;

the improved structure comprising in combination with the
    n. a bail handle attached to the bail so that the bail may be operated from a remote position,
    o. a catch handle attached to the catch so that the catch may be operated from a remote position, p. a notch on the catch, and q. a finger on the bail, so that the bail may be latched up thereby freeing the ball jaws.

2. In a trailer ball and socket coupler, the socket having a. a body, b. a bifurcated plate on the bottom of the body, c. a jaw bolt extending upward on each side of the bifurcation into the body, d. said jaw bolts parallel to each other, e. a ball jaw pivoted to each of the bolts, f. each of the ball jaws having an outer face and a concave inner face, g. a bail bolt extending across the body normal to the jaw bolts, h. a bail pivoted to the body by said bail bolt, j. a bail spring innerconnecting the body and bail to bias the bail closed, and k. a catch mounted on the body to lock the bail in a closed position, m. so that a ball with a stem may be locked into the socket with the ball over the bifurcated plate and the stem within the bifurcation and the jaws snuggly clasping the ball by the concave inner face and the jaws held closed by the closed bail snuggly contacting the outside faces and the bail locked down by the catch;

the improved structure comprising in combination with the n. a bail handle attached to the bail so that the bail may be operated from a remote position, o. a catch handle attached to the catch so that the catch may be operated from a remote position, p. an end on each of said handles, q. said ends being parallel when the bail is locked closed, and r. a slide fitting over the parallel ends holding the handles in the locked position.

3. The invention as defined in claim 2 further comprising:

s. a notch on the catch, t. a finger on the bail, so that the bail may be latched up thereby freeing the ball jaws.

4. The invention as defined in claim 3 further comprising:

u. a ball mounted in a bed of a pickup, v. said socket mounted on a gooseneck of a trailer, and w. said ball jaws locked on said ball.

5. The invention as defined in claim 4 further comprising:

x. a catch bolt parallel to said bail bolt, y. said catch pivoted to said catch bolt, z. a torsion catch spring on said catch bolt biasing said catch to the lock position, and aa. said bail spring being a torsion spring on said bail bolt.

6. In a trailer ball socket coupler, the socket having a. a body, b. a pair of ball jaws pivotally mounted to said body, c. each of the ball jaws having
  (i) an outer face, and
  (ii) a concave inner face, d. holding means for holding the ball jaws closed, and e. a catch mounted on the body to lock holding means in a closed position, so that f. a ball with a stem may be locked into the socket with the jaws snuggly clasping the ball by the concave inner face and the jaws held closed by the holding means and the holding means locked down by the catch;

the improved structure comprising in combination with the above:

g. a operating handle attached to the holding means so that the holding means may be operated from a remote position, h. a catch handle attached to the catch so that the catch may be operated from a remote position, j. a notch on the catch, and k. a finger on the holding means so that the holding means may be latched open thereby freeing the ball jaws.

7. In a trailer ball socket coupler, the socket having a. a body, b. a pair of ball jaws pivotally mounted to said body, c. each of the ball jaws having
  (i) an outer face, and
  (ii) a concave inner face, d. holding means for holding the ball jaws closed, and e. a catch mounted on the body to lock the holding means in a closed position, so that f. a ball with a stem may be locked into the socket with the jaws snuggly clasping the ball by the concave inner face and the jaws held closed by the holding means and the holding means locked down by the catch;

the improved structure comprising in combination with the above:

g. a operating handle attached to the holding means so that the holding means may be operated from a remote position, h. a catch handle attached to the catch so that the catch may be operated from a remote position, j. an end on each of said handles, k. said ends being parallel when the holding means is locked closed, and m. a slide fitting over the parallel ends holding the handles in the locked position.

8. The invention as defined in claim 7 further comprising:

a notch on the catch, o. a finger on the holding means so that the holding means may be latched open thereby freeing the ball jaws.

9. The invention as defined in claim 8 further comprising:

p. a ball mounted in the bed of a pickup, q. said socket mounted on a gooseneck of a trailer, and r. said ball jaws locked on said ball.

* * * * *